United States Patent
Doung et al.

(10) Patent No.: US 6,657,675 B1
(45) Date of Patent: Dec. 2, 2003

(54) METHOD AND APPARATUS FOR CONVERTING NON-STANDARD VIDEO BROADCAST SIGNALS TO DISPLAY CAPABLE VIDEO SIGNALS

(75) Inventors: Cheen Doung, Cupertino, CA (US); Lei He, Santa Clara, CA (US); Yi Chen, San Jose, CA (US); Hong Min Zhang, Santa Clara, CA (US)

(73) Assignee: NDSP Corporation, Campbell, CA (US)

( * ) Notice: Subject to any disclaimer, the term of this patent is extended or adjusted under 35 U.S.C. 154(b) by 0 days.

(21) Appl. No.: 09/548,926

(22) Filed: Apr. 13, 2000

(51) Int. Cl.[7] .................... H04N 11/20; H04N 7/01
(52) U.S. Cl. .................. 348/449; 348/441; 348/604
(58) Field of Search .................. 348/441, 449, 348/458, 459, 604; H04N 11/20, 7/01, 5/14, 9/64

(56) References Cited

U.S. PATENT DOCUMENTS

| | | | | |
|---|---|---|---|---|
| 4,403,256 A | * | 9/1983 | Green et al. | 348/208.3 |
| 4,630,098 A | * | 12/1986 | Fling | 348/449 |
| 4,665,437 A | * | 5/1987 | Nicholson | 348/449 |
| 4,860,090 A | * | 8/1989 | Murata et al. | 348/604 |
| 4,985,757 A | * | 1/1991 | Yasuki et al. | 348/604 |
| 5,452,011 A | * | 9/1995 | Martin et al. | 348/526 |
| 5,521,712 A | * | 5/1996 | Oguro | 348/468 |
| 5,786,868 A | * | 7/1998 | Hankinson | 348/536 |
| 6,366,327 B1 | * | 4/2002 | Renner et al. | 348/558 |

* cited by examiner

Primary Examiner—John Miller
Assistant Examiner—Trang U. Tran
(74) Attorney, Agent, or Firm—Marger Johnson & McCollom

(57) ABSTRACT

Non-standard broadcast television signals are processed and converted for proper reception and display. Extra or missing horizontal lines are processed using modulo or digital phase lock loop-type circuit to change clock output signal proportionately according to a difference determined by comparing a standard video signal value with an actual input signal line count value, such that modified clock output signal serves as a clock input signal for circuit accepting standard video format. Non-standard video signal having improper odd-even field sequencing is also processed and converted.

9 Claims, 1 Drawing Sheet

METHOD AND APPARATUS FOR CONVERTING NON-STANDARD VIDEO BROADCAST SIGNALS TO DISPLAY CAPABLE VIDEO SIGNALS

BACKGROUND

1. Field of Invention

The invention relates to the field of video signal processing, and particularly to processing of non-standard video signals.

2. Description of Related Art

Conventional television video broadcast signals comply with certain industry standards, such as PAL, SECAM, and NTSC for proper reception by various commercial TV receivers. In some broadcast locations, however, so-called non-standard video signals arise and are thereby broadcasted, for example, due to improper broadcast equipment or signaling. In such non-standard situations, conventional or standard television receiver equipment may not function properly. Problems may arise, for example, when non-standard signaling results in broadcast of video signals having more or less number of horizontal lines than ordinarily specified for standard programming. Accordingly, there is need to address non-standard video signals.

SUMMARY OF INVENTION

The invention enables television reception and display of non-standard broadcast signals, particularly by converting non-standard signals to acceptable signals. One preferred scheme processes non-standard video signals to handle any extra or missing horizontal lines, by using a digital frequency synthesizer, such as a modulo or digital phase lock loop-type circuit, to change a clock output signal proportionately according to a difference determined by comparing standard video signal value with actual input signal line count value, such that the modified clock output signal serves as a clock input signal for the following circuit, which accepts standard video format. Another alternative scheme processes a non-standard video signal to handle improper odd-even field sequencing of broadcast video signal.

DETAILED DESCRIPTION OF PREFERRED EMBODIMENTS

Figure 1:
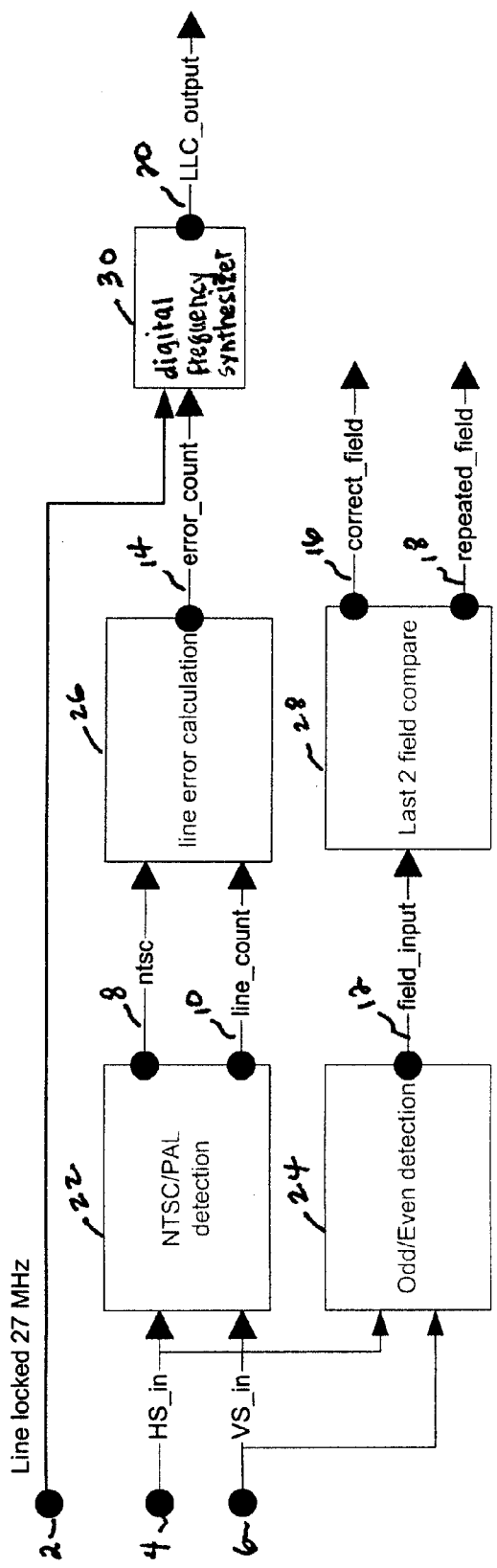
FIG. 1 is a generalized logic diagram of video signal processing functions for implementing embodiments of the present invention.

FIG. 1 logic diagram shows video signal detecting a block 22 for detecting a video type from horizontal synchronization (hsync) 4 and vertical synchronization (vsync) 6 signals, and generating therefrom a video type indication signal 8 and horizontal line count signal 10.

Further, the method calculates from block 26 a video type indication signal 8 and horizontal line count signal 10 to generate a line error count signal 14, which is processed digitally by count function 30 with line lock signal 2 to generate clock output signal 20. Accordingly, signal 14 provides horizontal input line count determination, and line error calculation 26 is achieved preferably by subtracting or adding line count from one or more specified line count value provided in a memory or other storage table. Signal 14 may indicate positive or negative line count error delta, such that digital frequency synthesizer 30 may compare any specified reference lock synchronization signal 2 thereto, and thereby proportionately generate dynamically modified "good" or standard clock signal 20.

Preferably, hsync or vsync signal 4, 6, respectively, is non-standard (i.e., does not necessarily comply precisely with conventional video hsync or vsync format, such as line count); however, in accordance with one aspect of the present invention, clock output signal 20 is standard (i.e., complies with one or more conventional video hsync or vsync format.)

Preferably, as referred to herein, the term "video type" is understood to correspond to one or more recognized industry standard video format, such as National Television Standards Committee, Public Access Line, or System Electronique Couleur Avec Memoire, including any extensions thereto. Thus, video type indication signal 8 may include or encode one or more digitally switchable bits to identify particular video format. Further, preferably, line error count signal 14 is generated according to a subtraction calculation, and clock output signal 20 is generated digitally by a digital frequency synthesizer.

Present implementation, preferably in a digital signal processing chip or circuit, may serve to determine whether input video signal differs from standard video signal, for example, by counting lines on each field for comparison with one or more standard value. The difference may then be sent to a digital frequency synthesizer (e.g., modulo counter, phase lock loop, etc.), such that a clock output signal is adjusted proportionately, thereby serving as clock input for any following circuit that only accepts standard video. In this example, digital frequency synthesizer's output frequency may be determined according to standard line count per field, which is divided by input line count per field.

Additionally, in an alternate embodiment, video signal processor may include separately, or in combination with foregoing functions, detection function 24, which receives hsync. and vsync signal 4, 6, determines odd or even field condition, and generates. field condition signal 12. Hence, for a given video field, odd/even detection module 24 applies subtraction or addition to determine whether field is odd or even. In this detection scheme, it is determined when video signal fields are not alternating properly, i.e., between odd and even fields.

Moreover, comparison function 28 receives field condition signal 12 and generates correct field signal 16 and repeat field signal 18. Preferably, the correct field signal 16 is generated by comparing current field condition with most-recent field condition, as well as next most recent field condition. Accordingly, present approach provides odd/even error detection preferably when three "bad" fields in sequence are recognized dynamically.

Moreover, effectively in a splicing approach, when three bad fields in a row are detected, present digital signal processing may serve to "flip" or swap fields associated with last two of three neighboring fields in video input stream, thereby restoring proper odd/even field sequence.

For further illustration of present signal processing scheme, following C pseudo-code is provided for handling NTSC and PAL formats:

```
//definitions:
// reset: reset signal when system starting up, or system need restart
// horizontal_sync_edge : the leading edge of horizontal sync pulse
// vertical_sync_edge : the leading edge of vertical sync pulse
// ntsc: when input is NTSC standard
// pal: when input is PAL standard
// even field: when input is even field
// odd field: when input is odd field
// expected_line_count: expected line count for each field
// horizontal_line_count: measured line count for each field
// horizontal_counter: active line counter, indicate current line number
// modified_clock_output_frequency: modified clock output frequency
// standard_system_frequency: system frequency if input is standard signal
//prerequisite:
//vertical sync edge is always ahead of horizontal edge when even field
//vertical sync edge is always in the middle of horizontal edge when odd field
if (ntsc) expected_line_count = 262 ;    // half of 525, use integer
if (pal) expected_line_count = 312 ;     // half of 625, use integer
if (reset) horizontal_counter = 0;
if (horizontal_sync_edge) horizontal_counter = horizontal_counter + 1 ;
if (vertical_sync_edge) {
          horizontal_line_count = horizontal_counter ;
if (even_field) horizontal_counter = 0 ;
// update horizontal line count and initialize counter differently for odd and
even field
if (odd_field) horizontal_counter = 1 ;
}
modified_clock_output_frequency =
(horizontal_line_count / expected_line_count) * standard_system_frequency
// use standard frequency synthesizer to generate modified output clock from
// modified_clock_output_frequency
// definitions
// current_field: most recent field detected.
// minus1_field: the field before current field
// minus2_field: the field before minus1_field
// outputfield: retored field
if ((minus1_field == minus2_field) & (minus1_field == minus2_field))
output field = !output_field;//flip the field
else output field = current_field;//no change
//preparations before next field starts
minus1_field = current_field;
minus2_field = minus1_field;
(horizontal_line_count / expected_line_count) * standard_system_frequency ;
```

The above embodiments are only illustrative of the principles of this invention and are not intended to limit the invention to the particular embodiments described. For example, one skilled in the art should recognize that present signal processing scheme may be employed in one or more digital electronic circuits, logic modules, and/or functionally equivalent firmware or software. Accordingly, various modifications, adaptations, and combinations of various features of the described embodiments can be practiced without departing from the scope of the invention as set forth in the appended claims.

What is claimed is:

1. Video signal processing method comprising:
   generating a horizontal line count signal by counting horizontal lines between sequential vertical synchronization signals;
   generating a video type indication signal responsive to the vertical synchronization signal and a horizontal synchronization signal and;
   generating a line error count signal responsive to the horizontal line count signal and the video type indication signal; and
   generating a clock output signal responsive to the error count signal.

2. The method of claim 1 wherein
   the horizontal synchronization signal or the vertical synchronization signal are non-standard; and
   the clock output signal is standard.

3. The method of claim 1 wherein the video type corresponds to a NTSC, PAL, or SECAM format.

4. The method of claim 1 wherein generating the line error count signal using subtraction.

5. The method of claim 1 wherein generating the clock output signal includes using a digital frequency synthesizer.

6. Video signal processor comprising:
   a detector adapted to receive a horizontal synchronization (hsync) signal and a vertical synchronization (vsync) signal, determine a video type responsive to the hsync and vsync signals, and generate a horizontal line count signal by counting a number of hsync signals between sequential vsync signals;
   a calculator adapted to generate a line error count signal responsive to the horizontal line count signal and the video type indication signal; and
   a frequency synthesizer adapted to generate a clock output signal by modifying an input clock signal with the error count signal.

7. The processor of claim 6 wherein
the hsync signal or the vsync signal are non-standard; and
the clock output signal is standard.

8. The processor of claim 6 wherein
the video type corresponds to a NTSC, PAL, or SECAM format.

9. The processor of claim 6 wherein
the calculator generates the line error count signal according to a subtraction calculation.

* * * * *

UNITED STATES PATENT AND TRADEMARK OFFICE
CERTIFICATE OF CORRECTION

PATENT NO.   : 6,657,675 B1
DATED        : December 2, 2003
INVENTOR(S)  : Doung et al.

It is certified that error appears in the above-identified patent and that said Letters Patent is hereby corrected as shown below:

Column 2,
Line 13, "or System Electronique" should read -- or Systeme Electronique --.
Line 41, "generates. field" should read -- generates field --.
Line 36, "//outputfield: retored" should read -- //output_field: retored --.
Line 57, "signal and; generating" should read -- signal; generating --.

Signed and Sealed this

Thirteenth Day of July, 2004

JON W. DUDAS
*Acting Director of the United States Patent and Trademark Office*